United States Patent [19]

Chen et al.

[11] Patent Number: 5,521,630
[45] Date of Patent: May 28, 1996

[54] FRAME SAMPLING SCHEME FOR VIDEO SCANNING IN A VIDEO-ON-DEMAND SYSTEM

[75] Inventors: Ming-Syan Chen, Yorktown Heights; Dilip D. Kandlur, Briarcliff Manor; Philip S. Yu, Chappaqua, all of N.Y.

[73] Assignee: International Business Machines Corporation, Armonk, N.Y.

[21] Appl. No.: 222,781

[22] Filed: Apr. 4, 1994

[51] Int. Cl.$^6$ ........................................... H04N 7/16
[52] U.S. Cl. ........................................ 348/7; 348/12
[58] Field of Search ................................. 348/7, 12, 13, 348/714–716, 718, 719; 455/4.2, 5.1, 6.1; H04N 7/16, 7/173

[56] References Cited

U.S. PATENT DOCUMENTS 5,247,347  9/1993  Litteral et al. ........................ 358/85
5,371,532  12/1994 Gelman et al. ........................ 348/7

Primary Examiner—Victor R. Kostak
Attorney, Agent, or Firm—Richard M. Ludwin

[57] ABSTRACT

A system and method for performing variable speed scanning or browsing, wherein a user controls the playout speed of a movie, which does not require additional disk or network bandwidth resources. In a preferred embodiment, the method provides for scanning operations for an Motion Picture Experts Group (MPEG) video stream. The method satisfies the constraints of the MPEG decoder (in the users set-top box) and require a minimum of additional system resources. The embodiments of the present invention include (a) a storage method, (b1) a segment sampling method, (b2) a segment placement method, and (c) a playout method, where (b1) and (b2) are two alternatives for segment selection. Thus, two sets of solutions are provided to support variable speed scanning in a disk-array-based video server: One using (a), (b1) and (c), and the other using (a), (b2) and (c).

9 Claims, 6 Drawing Sheets

RELATION BETWEEN I, P AND B FRAMES

TYPICAL FRAME SEQUENCE:
    IBBPBBPBBPBBPBBI

STORAGE ORDER
    IPBB...

| DISK NO. | 0 | 1 | 2 | 3 | 4 | 5 | 6 | 7 | 8 |
|---|---|---|---|---|---|---|---|---|---|
| 1ST ROUND | 0* | 1 | 2 | 3* | 4 | 5 | 6* | 7 | 8 |
| SEGMENTS | 9 | 10* | 11 | 12 | 13* | 14 | 15 | 16* | 17 |
| RETRIEVED (*) | 18 | 19 | 20* | 21 | 22 | 23* | 24 | 25 | 26* |
| 2ND ROUND | 27 | 28 | 29* | 30 | 31 | 32* | 33 | 34 | 35* |
| SEGMENTS | 36 | 37* | 38 | 39 | 40* | 41 | 42 | 43* | 44 |
| RETRIEVED (*) | 45* | 46 | 47 | 48* | 49 | 50 | 51* | 52 | 53 |

A FAST RETRIEVAL FOR n=9 AND m=3

FRAME SAMPLING SCHEME FOR VIDEO SCANNING IN A VIDEO-ON-DEMAND SYSTEM

BACKGROUND OF THE INVENTION

1. Field of the Invention

The present invention relates to the support of video frame retrieval and scanning in a disk-array-based video server.

2. Related Art

In a video on demand (hereinafter, VOD) system, multimedia streams (movies) are stored on a storage server and played out to an end user (receiving) station upon request. The multimedia streams consist of compressed video and audio. The prevalent standard for the video is MPEG (Moving Picture Experts Group). Inter-frame compression techniques such as MPEG provide significant advantages in storage and transmission, and consequently they are universally accepted for VOD applications.

During normal playout, data blocks belonging to the multimedia stream are retrieved from the storage system and transmitted to the receiving station. The receiving station decodes the incoming stream and plays it out. In general, it is desirable to provide the user with VCR-like search functions such as "fast-forward" (also called "scan forward") in a VOD system. There are several conventional approaches to implementing this fast-forward (hereinafter, FF) function, some of which mimic the scan operation of an analog VCR or movie projector. However, each of these approaches imposes additional resource requirements on the system as explained below, where for ease of exposition, it is assumed that the movie has to be scanned at three times of the normal playout rate.

The multimedia stream is retrieved and transmitted at 3X of the normal playout rate, and the end station filters and plays out the data. This solution requires additional resources (3X the normal rate) at the storage system, the memory buffers, and the network. It also requires additional resources at the end station to process the incoming data.

The storage system retrieves and transmits every third frame to the end station. This solution requires a significant amount of additional system resources. The multimedia file must now be indexed to retrieve individual frames, and the amount of retrieved data is higher than normal due to the structure of the inter-frame coding.

The system switches over to a separately coded FF stream to provide the scan operation. This solution, though eliminating any additional read bandwidth or network bandwidth, is extremely expensive in terms of storage cost.

SUMMARY OF THE INVENTION

It is an object of this invention to support fast-forward and fast-backward (scanning) video frame retrieval in a disk-array-based video server.

It is a further object of this invention to support variable speed scanning in video server.

To avoid the previously described drawbacks, the present invention provides a system and method for performing variable speed scanning or browsing, wherein a user controls the playout speed of a movie, which does not require additional disk or network bandwidth resources.

In a preferred embodiment, the method provides for variable speed scanning operations for an MPEG video stream. The method satisfies the constraints of the MPEG decoder (in the users set-top box) and require a minimum of additional system resources. The embodiments of the present invention include (a) a storage method, (b1) a segment sampling method, (b2) a segment placement method, and (c) a playout method, where (b1) and (b2) are two alternatives for segment selection. Thus, two sets of solutions are provided to support variable speed scanning in a disk-array-based video server: One using (a), (b1) and (c), and the other using (a), (b2) and (c).

An MPEG video stream is composed of three types of frames: intra frames (I), predictive frames (P) and interpolated frames (B). The storage method divides a stream of MPEG video frames into media segments. Each segment comprises consecutive frames beginning with an I frame and ending before another I frame. Allocation and retrieval of the multimedia stream is in units of segments. Consecutive segments are stored on different disks in the disk array.

During normal playout, one media segment is retrieved from each disk in a disk array with, say n, disks. These n segments are buffered in memory and transmitted at a fixed rate to the receiving station. In order to preserve smooth operation during the FF mode, n consecutive segments in the scan sequence reside in n different disks.

The segment sampling method, which selectively retrieves segments from a disk array where segments are placed in a round-robin manner, supports segment sampling for FF retrieval, at any FF rate desired by viewers. The segments sampled by this method are uniformly distributed with a minimal variation on the number of segments skipped between every two consecutive retrievals.

The segment placement method is an alternative to the segment sampling method for segment selection. In contrast to the segment sampling method (that is used for a disk-array-based video server where segments are placed in a round-robin manner) the segment placement method allocates segments to disks judiciously such that no special provision is needed for sampling and the segments can be completely uniformly sampled in an scanning mode for some pre-determined scanning speeds.

The playout method operates the receiving station to play out the retrieved video stream for scanning retrieval. This method, by selectively parsing the incoming media stream and adjusting presentation time-stamps, minimizes the buffer space and the transmission bandwidth required by the server and the end station. These, and other objects, features and advantages of this invention will become apparent from the following detailed description of the invention taken in conjunction with the accompanying drawings.

DETAILED DESCRIPTION OF A PREFERRED EMBODIMENT

Figure 1:
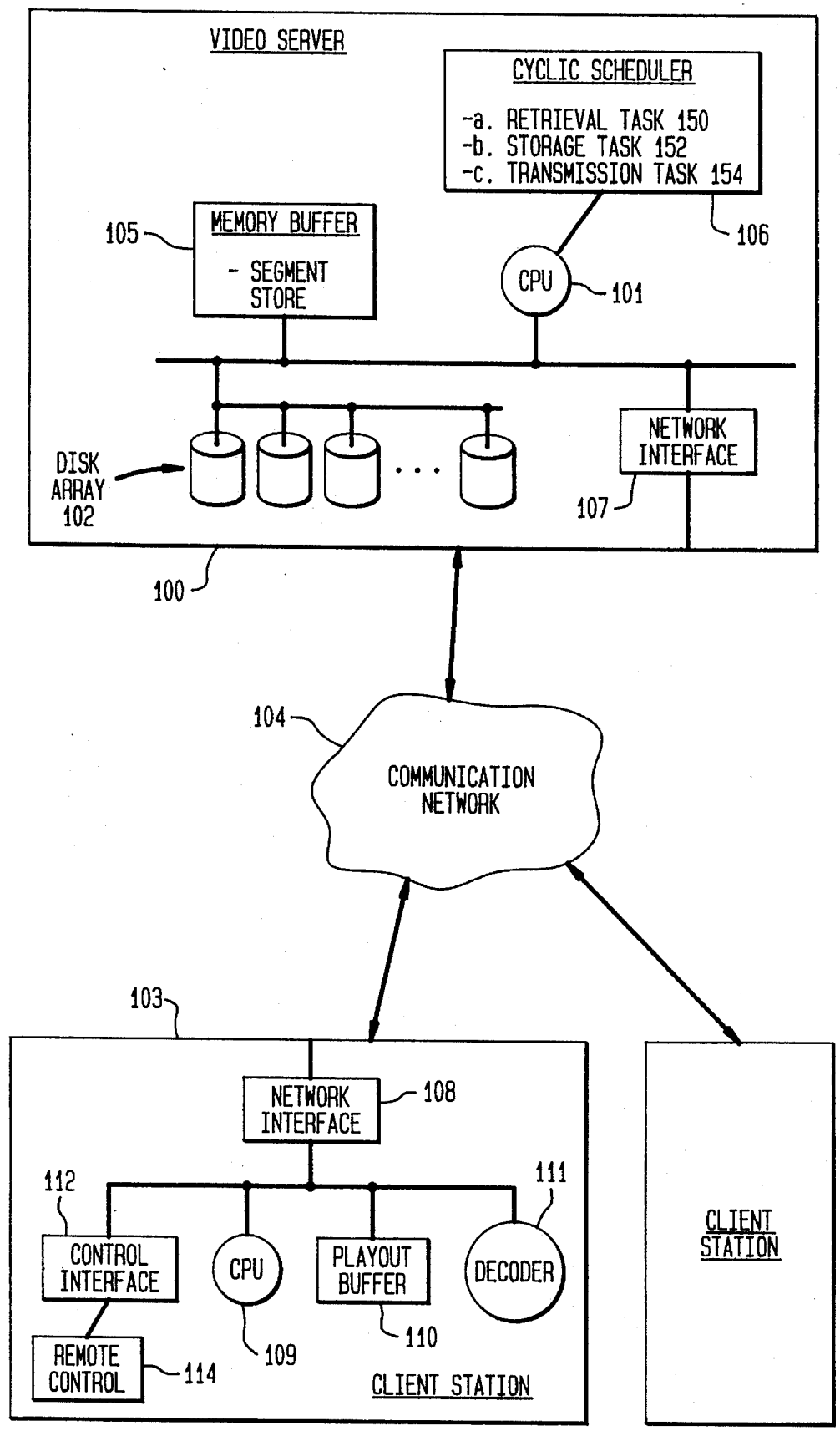
FIG. 1 shows a disk-array-based multi-media video server in a network.

FIG. 1 shows a disk-array-based video server 100, wherein video data is stored in the disk array 102 and transmitted to the end client stations 103 over the network 104 upon request. The movies (videos) are stored on the disks 102. The video server 100 includes a processor (cpu) 101 which executes tasks under control of a cyclic schedular 106. These tasks include a retrieval task 150 which retrieves videos from the disks 102, a storage task 152 which stores videos temporarily in the memory buffer 105 and a transmission task 154 which transmits videos to client stations 103 by way of a communication network 104 via a network interface 107.

Each of the client stations 103 includes a network interface which provides bi-directional communication between the client station 103 and the video server video the communication network. The client stations also each include processor (cpu) 109 which receives videos via a client station network interface 108 into a playout buffer 110. Each client station 103 also includes a decoder 111 which receives movies from the playout buffer and decodes them for performance on the clients display equipment (such as a television set) and a control interface 112 which receives control commands (including scan speed control commands) from a user via a remote controller 114. These commands are communicated to the video server via the network interface 108 and the network 104.

The video server 100 can be embodied using any processor of sufficient performance for the number of video streams to be supported. For example, a small capacity video server could be embodied using an RISC System/6000 TM system while a larger capacity server could be embodied using an ES/9000 TM system (both available from International Business Machines Corporation of Armonk, N.Y.). The disk array 102 can be of the RAID level 5 type. The communication network 103 can be, for example, a fiber optic network or a conventional bi-directional cable network. The client stations 103 can be embodied as a set-top box. The Remote control 114 and the control logic can be coupled by way of a conventional infra-red interface. The clients send commands to the server 103 by way of the network 104. In accordance with an embodiment of the present invention, the client can control the scan speed of the video (along a continuous spectrum) by depressing particular buttons on the remote controller 114.

For clarity, the example of fast forward operations will be used in this description. It should be understood however that the described principals apply equally to fast backward (FB) operations.

Figure 2:
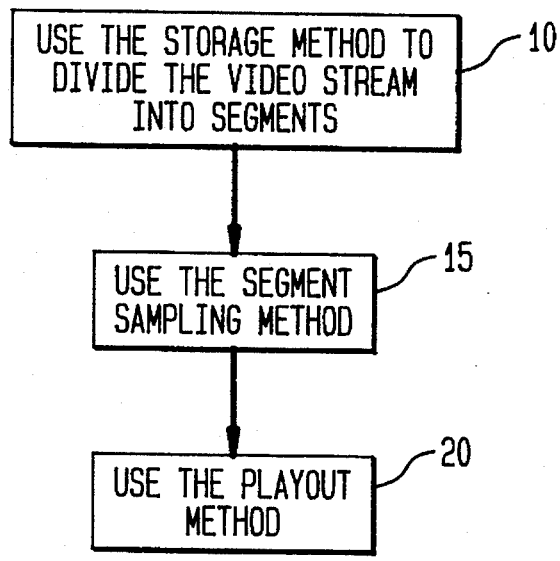
FIG. 2 is a block diagram for the procedure of fast-forward retrieval using the segment sampling method.

FIG. 2 illustrates one way to achieve the FF retrieval in a disk-array-based video server, using a storage method 10, a segment sampling method 15, and a playout method 20 according to an embodiment of the present invention. The storage method 10 divides a stream of MPEG video frames into media segments. Each segment comprises consecutive frames beginning with an I frame and ending before another I frame. Allocation and retrieval of the multimedia stream is in units of segments. The segment sampling method 15 selectively retrieves segments from a disk array where segments are placed in a round robin manner and performs fast forward (FF) retrieval at any fast forward speed desired by viewers. The playout method 20 causes the end station to play out the retrieved video stream from fast forward retrieval and maintains the same buffer space and transmission bandwidth requirement as in the normal play operation.

Figure 3:
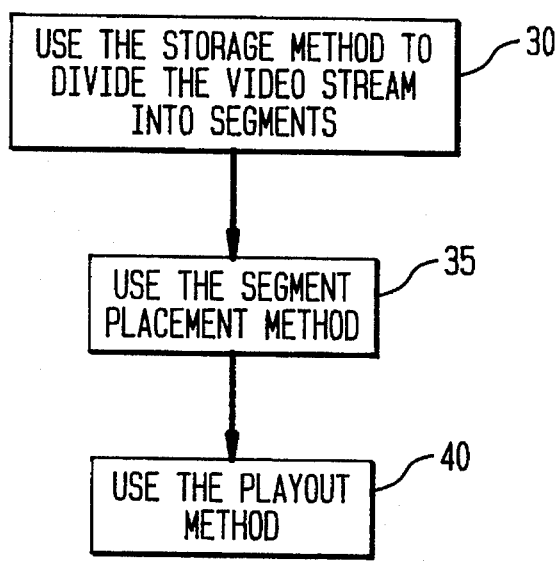
FIG. 3 is a block diagram for the procedure of fast-forward retrieval using the segment placement method.

FIG. 3 illustrates another way to achieve the FF retrieval in a disk-array-based video server using the storage method 10, the segment placement method 35, and the playout method 20 according to another embodiment of the present invention. The storage method 10 and the playout method 20 are the same as used in conjunction with the method of FIG. 2. The segment placement method 35 allocates segments to disks judiciously such that segments can be completely uniformly sampled in an FF mode for some predetermined FF speeds.

The various tasks and programs used to control scanning will now be described by reference to FIGS. 4–10.

Figure 4:
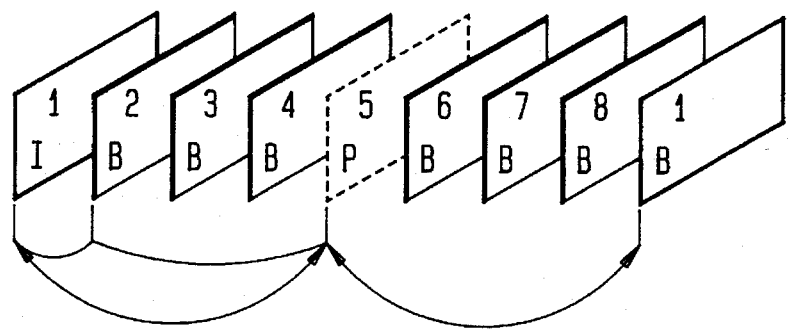
FIG. 4 shows a sequence for of MPEG frames.

FIG. 4 shows a Sequence of MPEG video frames 1–8 that is composed of intra frames (I), predictive frames (P), and interpolated frames (B). The storage order of the frames, which differs from the temporal order, reflects the order in which the frames have to be delivered to the decoder. In the MPEG stream P frames depend on I frames, and B frames depend upon both I and P frames. Hence, it is not possible to play out B frames without the corresponding I and P frames. It is therefore not possible to play out every third frame to achieve 3X playout since this subset would include B frames without the corresponding anchor I or P frames.

For the foregoing reasons, the present storage method divides an MPEG video stream into media segments. Each segment includes consecutive frames beginning with an I frame and ending before another I frame. Allocation and retrieval of the multimedia stream is in units of segments. Consecutive segments are stored on different disks in the disk array 102.

Figure 5:
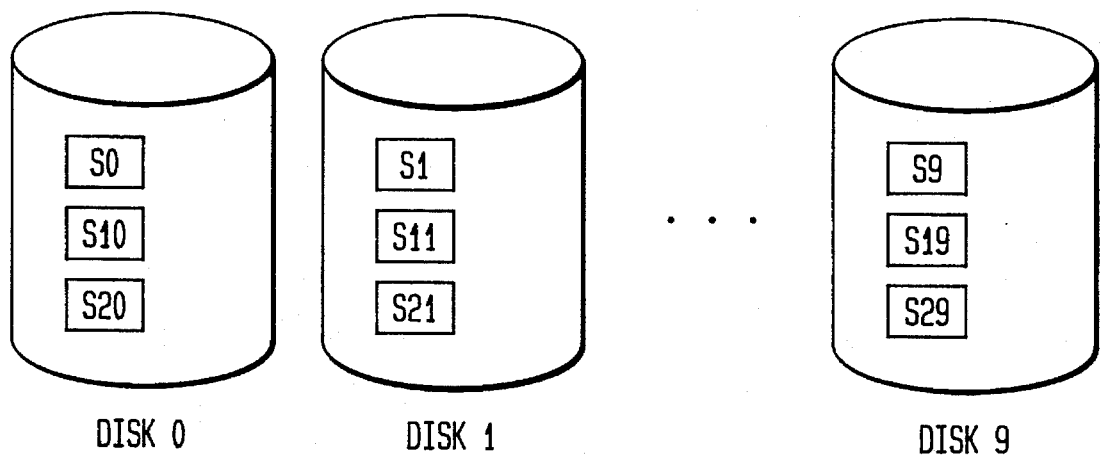
FIG. 5 shows a disk array where video segments are stored in a round robin manner.

The segment sampling method of the retrieval task 150 will now be described. Consider a disk-array-based video server of the type shown in FIG. 1 in which there are n disks. For the maximal throughput during the normal (standard playback speed) operation, video segments S0–S29 are stored in the disk array 102 in a round-robin manner so that n consecutive segments can be retrieved in one round. Formally, when there are n disks, segment g is stored in disk k=f1(g,n) where f1(g,n)=g mod n. FIG. 5 illustrates an example round-robin segment placement when n=10.

To achieve the FF feature, one has to appropriately sample some segments only, while skipping the others. The sampling rate depends upon the FF speed desired. If the FF speed is m times the normal speed, we would in average sample one segment out of m segments. For example, if the FF speed m equals 3, segments s0, s3, s6 and s9 will be retrieved from disk 0, disk 3, disk 6 and disk 9, respectively, in FIG. 5, while skipping segments s1, s2, s4, s5, s7 and s8. The complete sampling procedure will be described in more detail later by reference to the segment sampling method.

To provide the best output during FF, the segments sampled should be as uniformly distributed as possible. For example, to double the speed, one can simply select even segments while skipping the odd ones. However, it can be verified that this method, while uniformly sampling the segments, will not obtain the maximal throughput when there are an even number of disks in the array (such as the situation in FIG. 5 where n=10). Specifically, where only the even segments are selected, only half of the disks (i.e., disks with even numbers) participate in the segment retrieval whereas the other half disks (i.e., disks with odd numbers) remain idle. Consequently, to develop an FF video segment retrieval scheme in a disk array where segments are stored in a round-robin manner, we not only want to sample the segments as uniformly as possible but also need to ensure that the maximal throughput is attained. Such a procedure is described below.

Figure 6:
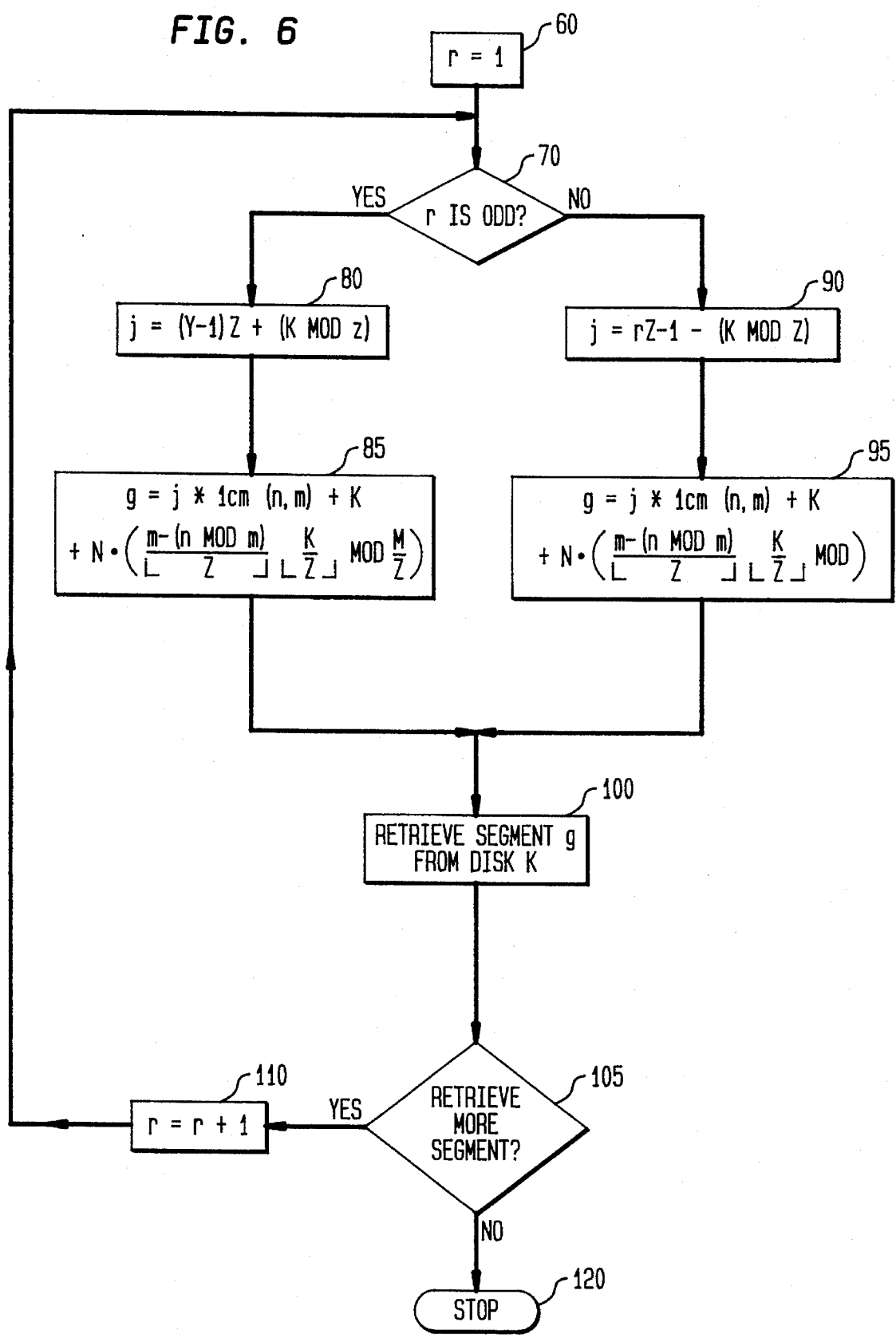
FIG. 6 is a detailed flow diagram for a segment sampling method program.

FIG. 6 is a flow chart of a program in the retrieval task 150 for determining, for each disk, which video segment to retrieve in an FF mode. Suppose the number of disks in the array is n and the FF speed desired is m times as the normal operation. Let 1 cm(n,m) denote the least common multiple of m and n. For example 1 cm(3,9)=9. Let z=nm/1 cm(n,m), for notational simplicity. To facilitate the description, an FF segment retrieval for n=9 and m=3 is given in FIG. 7, where the segments retrieved are marked with *'s.

Referring now to FIG. 6, the round number of segment retrieval, r, equals one in the beginning (step 60). Depending on whether r is an odd number or an even number, each disk will use proper formulas to determine the segment to retrieve (step 70). The case that r is an odd number corresponds to the first half of the zig-zag curve resulting from the segments retrieved, such as the line formed by segments 0*, 10* and 20* in the first round of FIG. 7. On the other hand, the case that r is an even number corresponds to the second half of the zig-zag curve, such as the line formed by segments 29*, 37* and 45* in the second round of FIG. 7. Specifically, if r is an odd number, segment g will be retrieved from disk k, where g is uniquely determined by steps 80 and 85. If r is an even number, segment g will be retrieved from disk k, where g is uniquely determined by steps 90 and 95. After segment g is retrieved from disk k retrieves in step 100, if more video segments are needed (step 105), go to step 110 and increase the round number r by one. Otherwise, this procedure ends in step 120.

Figures 7, 8:
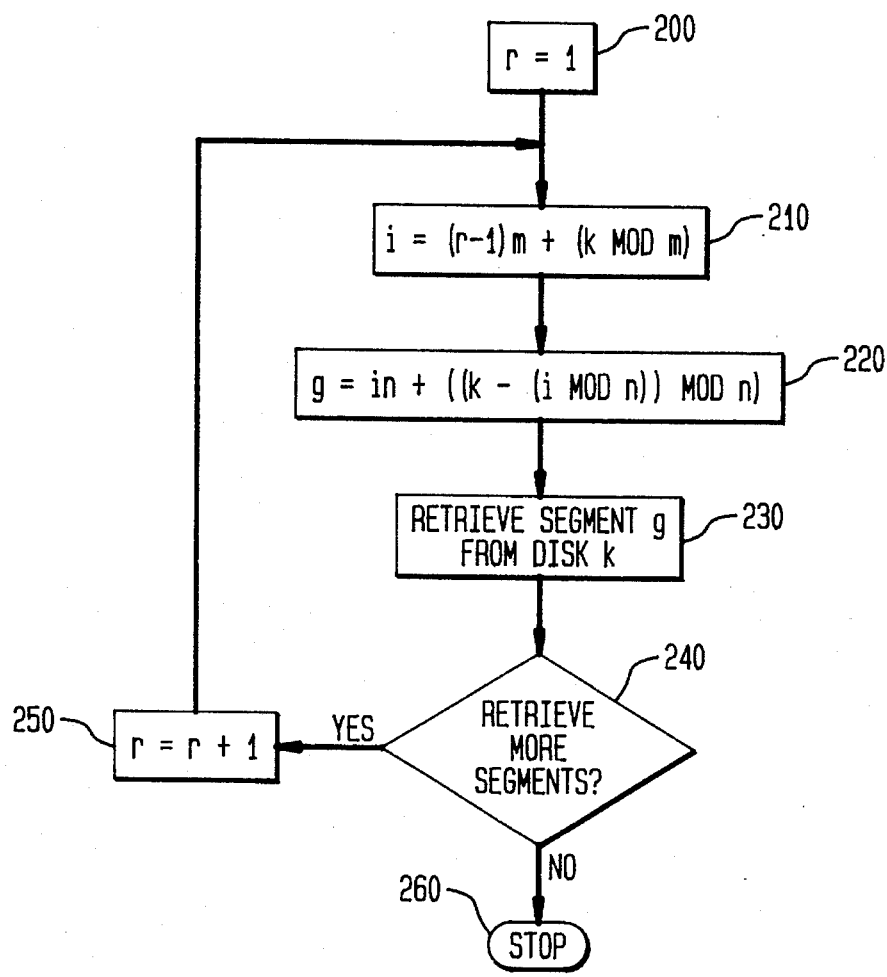
FIG. 7 shows an example for the segment sampling method.
FIG. 8 is a detailed flow diagram for a segment placement method program.

Referring again to FIG. 7, the example for n=9 and m=3 is provided and those segments retrieved are marked with *'s. Instead of retrieving segments whose numbers are multiples of three (which would make disks 1, 2, 4, 5, 7 and 8 idle), the segment sampling scheme described in FIG. 6 shifts the video segments retrieved in some retrievals. For example, segment 10 is fetched instead of segment 9, and segment 20 is fetched instead of segment 19. Such shifting, though making the segments retrieved not perfectly uniformly distributed, ensures that the maximal throughput is achieved. The group of segments retrieved in the first round of retrieval in FIG. 7 consists of segments 0, 10, 20, 3, 13, 23, 6, 16 and 26, which are then displayed in the order of 0, 3, 6, 10#, 13, 16, 20#, 23, 26, where # indicates a shift for retrieved segment numbers. Under this scheme, the segments retrieved in the second round of retrieval in FIG. 7 are segments 45, 37, 29, 48, 40, 32, 51, 43, and 35, which are then displayed in the order of 29, 32, 35, 37#, 40, 43, 45#, 48, 51. It can be seen from FIG. 7 that the segments retrieved form a zig-zag curve. The number of shifts in a zig-zag is 2 nm/1 cm(n,m)−2, which is the minimum among all FF schemes that could achieve the maximal throughput in a disk-array-based video server where segments are stored in a round-robin manner.

The segment placement method will now be described. As shown in FIG. 2 and FIG. 3, the segment placement method is an alternative to the segment sampling method previously described. In contrast to the segment sampling method (which selectively retrieves segments from a disk array in which segments are stored in a round-robin manner) the segment placement method allocates segments to disks judiciously such that no special provision is needed for sampling and the segment can be completely uniformly sampled in an FF mode for some pre-determined FF speeds. Consider an FF operation in which the playout rate is m times as the normal playout rates. In this FF mode, the sequence of retrieved segments from a given starting segment i is {i, i+m, i+2 m, i+3 m, . . . }. Since n media segments are retrieved in each round, the segments to be retrieved are {(r−1)nm, (r−1)nm+m, (r−1)nm+2 m, . . . , (r−1)nm+(n−1)m}, where r is the round number of segment retrieval. It is necessary to ensure that these segments be mapped to different disks so as to have the maximal throughput. The segment placement function f2(g,n), defines a mapping from media segment g to a disk k, where k is a number ranging from 0 to n−1 in the disk array with n disks.

Assuming that m is a sub-multiple of the number of disks n, the mapping function can be defined as follows: f2(g,n)= (g+[g/n]) mod n. The first term (g) represents a regular scattering of the segments on the n disks and the second (g/n) represents a skew factor. It can be shown that f2(g,n) maps the segments {(r−1)nm, (r−1)nm+m, (r−1)nm+2 m, . . . , (r−1)nm+(n−1)m} to different disks for any r.

Referring now to FIG. 8 (which shows a flow chart of a segment placement program in the retrieval task 150), the round number of segment retrieval, r, equals one in the beginning (step 200). In the r-th round, disk k will locate its i-th disk (i.e., segment number g) to retrieve, where the numbers i and g are uniquely determined by steps 210 and 220, respectively. After segment g is retrieved from disk k in step 230, if more video segments are needed (step 240), go to step 250 and increase the round number r by one. Otherwise, this procedure ends in step 260.

Figure 9:
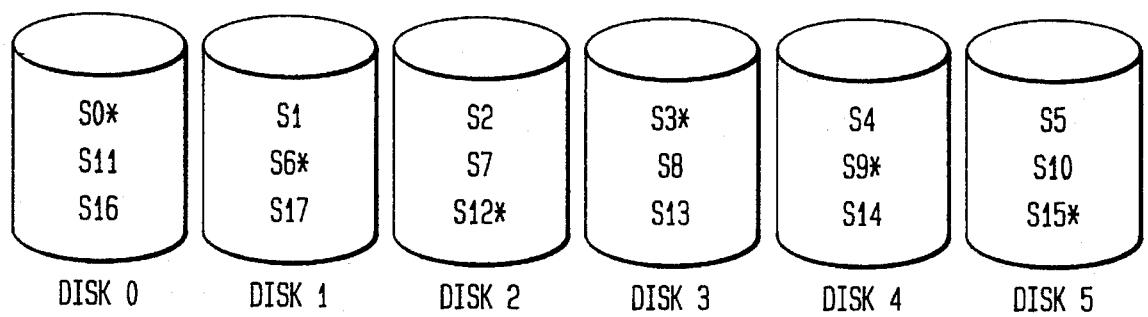
FIG. 9 shows an example for the segment placement method.

Referring now to FIG. 9, the placement of video segments in a disk array with 6 disks when the required FF speed is three times as the normal operation is given. This layout of media segments across n disks ensures smooth retrieval for playout at different FF speeds if the FF speed-up m is a sub-multiple of the number of disks n. The layout ensures that the media segments to be retrieved in a round all reside in different disks, so that the load imposed on the storage system by the retrieval process in the FF mode is identical to the load under normal operation.

Figure 10:
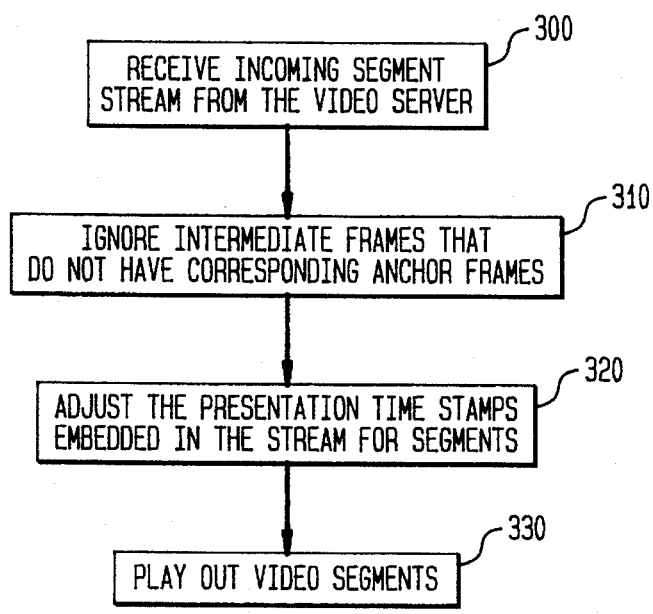
FIG. 10 is a block diagram for the playout procedure.

The playout method is now described. During the normal speed playout, video data is retrieved from the disk in rounds. In each round one media segment is retrieved from each disk in the disk array. The data is buffered temporarily in the server and transmitted at a fixed rate to the end station. In the FF mode, the server retrieves segments based on either the procedure in FIG. 2 or the one in FIG. 3. Referring now to FIG. 10, the processing steps of the receiving station that has the responsibility of parsing the incoming stream and creating a valid input stream for the decoder are given. The receiving end station 103 receives the incoming segment stream from the video server 100 in step 300, and discards intermediate frames that do not have the associated anchor frames in step 310. Note that although the media segment begins with an I frame, it contains B frames that have an anchor frame outside the media segment. These B frames are located immediately after the I frame as shown in FIG. 4, and are ignored since they depend on the last P frame in the preceding media segment which is not retrieved. In step 320 the receiving station adjusts the presentation timestamps embedded in the stream. The presentation timestamp determines the time at which a video frame is to be displayed. It has to be adjusted to compensate for the skipped segments and also for the dropped B frames, so as to reflect the correct playout time. Video frames are then played out in step 330.

This playout policy results in a piecewise continuous playout sequence. It allows the viewer to examine scenes in order to quickly locate the scene of interest. Since the segment size is fixed, no additional buffer or transmission bandwidth is required for the stream. The segment maintains the average data rate of the stream, and hence it is acceptable to the end station decoder.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. A method of performing variable speed scanning operations in a video server wherein at least one data stream is provided from a mass storage media, comprising the steps of:

receiving, by the video server, a performance request from a viewer for showing a particular video;

transmitting a first data stream carrying the particular video from the video server to reception equipment at the viewer's location;

receiving, by the video server, a scanning request including control data indicative of the viewer's selection of a scanning speed from a selectable range of scanning speeds faster than a normal playout speed;

based at least in part on the control data and a number of storage devices included in the mass storage media, identifying particular frames of the video to be retrieved from the mass storage media; and, transmitting, to the viewer's location, a second data stream including the particular frames instead of the frames that would have been transmitted had the video continued at a normal playout speed.

2. The method of claim 1 wherein the frames are identified and encoded as intra (I) frames, predictive frames and interpolated frames and stored in the mass storage media as units of retrieval, each of the units of retrieval comprising consecutive frames beginning with an I frame and ending before another I frame.

3. The method of claim 1 wherein the storage media is an array of disks and comprising the further step of distributing the frames among the disks in the array as a function of a number of disks in the array and at least one predetermined scanning rate.

4. The method of claim 1 wherein mass storage media is a disk array, and wherein the particular frames of the video are distributed evenly among the disks.

5. The method of claim 1 wherein the frames are stored as segments on the media and wherein each of the segments comprises a sequence of consecutive frames which can be decoded as a unit.

6. A method of performing scanning operations, comprising the steps of:

storing a video as blocks of data distributed among a plurality of storage devices;

performing the video for a user at a normal playout speed;

receiving a scanning request from the user;

responsive to the scanning request, identifying particular blocks of the data to be retrieved from the storage devices and provided to the user; and, retrieving the particular blocks of the data from the storage devices in parallel groups, wherein the quantity of the blocks retrieved in parallel for provision to the user in response to the scanning request is the same as the quantity of blocks retrieved in parallel for performance of the video at the normal playout speed.

7. The method of claim 6 wherein each of the blocks of the data each consist essentially of an intra (I) frame, a predictive frames and an interpolated frames in consecutive order, beginning with an I frame and ending before another I frame.

8. The method of claim 6 wherein the storing comprises the step of distributing the blocks of the data among the storage devices in a round robin sequence.

9. The method of claim 6 wherein the storing comprises the step of distributing the blocks of the data among the storage devices as a function of a particular scanning speed.

* * * * *